(12) United States Patent
Timinger (10) Patent No.: US 10,808,900 B1
(45) Date of Patent: Oct. 20, 2020

(54) AUTOMOTIVE LED LIGHTING MODULE

(71) Applicant: Lumileds LLC, San Jose, CA (US)

(72) Inventor: Andreas Timinger, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/789,130

(22) Filed: Feb. 12, 2020

(30) Foreign Application Priority Data

Oct. 25, 2019 (EP) ...................................... 19205248

(51) Int. Cl.
| | |
|---|---|
| *F21S 41/141* | (2018.01) |
| *H05B 45/10* | (2020.01) |
| *F21S 41/663* | (2018.01) |
| *H05B 45/3725* | (2020.01) |
| *F21Y 115/10* | (2016.01) |

(52) U.S. Cl.
CPC ............ *F21S 41/141* (2018.01); *F21S 41/663* (2018.01); *H05B 45/10* (2020.01); *H05B 45/3725* (2020.01); *F21Y 2115/10* (2016.08)

(58) Field of Classification Search
CPC ...... F21S 41/141; F21S 41/663; H05B 45/10; H05B 45/3725; F21Y 2115/10
See application file for complete search history.

(56) References Cited

U.S. PATENT DOCUMENTS

| | | | | |
|---|---|---|---|---|
| 9,974,135 B1* | 5/2018 | Nelson | ................. | B60Q 1/0023 |
| 2015/0102727 A1* | 4/2015 | Chen | ...................... | H05B 45/37 |
| | | | | 315/136 |
| 2015/0173149 A1* | 6/2015 | Park | ....................... | H05B 45/44 |
| | | | | 315/193 |
| 2018/0235046 A1 | 8/2018 | Muyshondt | | |
| 2019/0063704 A1* | 2/2019 | Diederich | ................ | B60Q 1/24 |

FOREIGN PATENT DOCUMENTS

| | | |
|---|---|---|
| DE | 102017130862 A1 | 6/2019 |
| WO | WO-2016207013 A1 | 12/2016 |

OTHER PUBLICATIONS

"European Application Serial No. 19205248.8, European Search Report dated Jan. 14, 2020", 5 pgs.

* cited by examiner

*Primary Examiner* — Mary Ellen Bowman
(74) *Attorney, Agent, or Firm* — Schwegman Lundberg & Woessner, P.A.

(57) ABSTRACT

Embodiments include an automotive LED lighting module comprising an LED lamp comprising a number of light-emitting diodes; a first driver module configured to drive the LED lamp at a first DC voltage level (U_hi); a second driver module configured to drive the LED lamp at a second DC voltage level (U_lo), which second DC voltage level (U_lo) is lower than the first DC voltage level (U_hi); and a switch arrangement comprising an interface for connection to a two-level DC voltage supply (PS), and wherein the switch arrangement is configured to connect the first driver module to the LED lamp when the input voltage is at a first level (U_hi), and to connect the second driver module to the LED lamp when the input voltage level is at a second level (U_lo). Embodiments can further include an automotive lighting system of a vehicle, and a method of operating an automotive LED lighting system.

20 Claims, 4 Drawing Sheets

AUTOMOTIVE LED LIGHTING MODULE

PRIORITY APPLICATION

This application claims the benefit of priority to EP Patent Application Serial No. 19205248.8, filed Oct. 25, 2019, which is incorporated herein by reference in its entirety.

FIELD OF THE DISCLOSURE

This disclosure describes an automotive LED lighting module; an automotive lighting system; and a method of operating an automotive LED lighting system.

BACKGROUND

Lighting units comprising light-emitting diodes (LEDs) are becoming more widespread in applications such as signalling lamps that are used in vehicles such as cars, motorcycles, buses etc. Such lamps must comply with strict regulations in order to obtain approval and certification. Standardized lamps that comply with a regulation such as the UN/ECE R128 regulation may be referred to by function, for example an LW5 lamp is a white lamp suitable for use as a front headlamp for daytime running lights (DRL) function; an LYS lamp is a yellow lamp suitable for used as a left/right signalling light, etc. These standardized automotive LED signalling lamps have built-in electronic drivers, and are designed to be connected to a specific "board voltage" to deliver the required luminous flux. The board voltage may be 12 V, for example. Automotive manufacturers may specify a board voltage range such 6-24 V to fulfil various requirements, for example an ECE regulation requires a testing voltage of 13.5 V for signalling lamps and a testing voltage of 12.3 V for lighting lamps.

Generally, automotive vehicles are required to provide multiple signalling lights. At a minimum, a vehicle usually must have front lights (high beam and low beam), front fog lights, tail-lights, brake lights, at least one reverse light, as well as front and rear indicator lights. In addition, a vehicle may be required to have front and rear position lights and/or side indicator lights and/or side position lights. A front position light can be on when the engine is stopped and the headlights are switched off. A front position light may also be on while driving. A rear position light may be referred to as a tail light. To realise two functions from the same location, for example side indicator lights and side position lights, a vehicle can be designed so that the lighting unit at the side is large enough to accommodate a side indicator light and a side position light.

For reasons of economy of space and to reduce costs, vehicle manufactures may prefer to design a vehicle so that a single lighting module fulfils more than one lighting function. To achieve this, for example to be able to use an LW5 lamp as a DRL headlamp and also as a front position light, the lamp flux must be reduced to a fraction of its rated or nominal flux. However, the driver of a prior art automotive LED lighting module can only work with a single DC voltage level. Therefore, to "dim" a prior art LED lighting module, the DC signal pulse-width modulated, effectively converting the DC voltage into a pulse train with a duty cycle that results in the desired "dimming" level. However, this approach requires a dedicated PWM module between the DC supply and the LED lamp, thereby adding to the overall cost. Another disadvantage of this approach is that the driver of a standardized automotive LED lamp is generally not designed to run off a PWM signal, and the light output may exhibit flicker.

An embodiment provides an automotive LED lighting module that overcomes the problems described above.

SUMMARY

According to embodiments, the automotive LED lighting module comprises an LED lamp comprising a number of light-emitting diodes; a first driver module configured to drive the LED lamp at a first DC voltage level; a second driver module configured to drive the LED lamp at a second DC voltage level, which second DC voltage level is lower than the first DC voltage level; and a switch arrangement comprising an interface for connection to a two-level DC voltage supply, and wherein the switch arrangement is configured to connect the first driver module to the LED lamp when the input voltage is at a first level, and to connect the second driver module to the LED lamp when the input voltage level is at a second level.

In the context of embodiments, it may be assumed that the first DC voltage level is used to drive the LED lamp at its rated output flux, i.e. at 100% of rated flux. When driven at the second level, the output flux of the lamp will be less than the rated level. The LED lighting module therefore makes it possible to realise an internal dimming of the LED lamp, triggered by the lower DC voltage level.

An advantage of the automotive LED lighting module is that there is no need to provide a PWM capability to convert the first DC voltage level to a pulse-width modulated voltage. A more pertinent advantage is that both lamp driver modules only receive straight DC voltage levels, so that there is no risk of flicker in the light output that might otherwise arise from a pulse-width modulated voltage input.

In the context of the disclosure, the term "driver module" shall be understood to mean the arrangement of components that collectively act as a driver. A driver module may be realised as a separate entity, i.e. the first and second driver modules are realised as functionally separate blocks. Alternatively, the driver modules are not realised as separate physical entities, and instead share a number of components. For example, the driver modules may share a linear driver, the first driver module may comprise further circuitry to generate the higher current level, and the second driver module may comprise further circuitry to generate the lower current level.

According to embodiments, the automotive lighting system of a vehicle comprises a DC voltage supply configured to provide at least a first DC voltage level and a second DC voltage level; a number of such automotive LED lighting modules connected to the DC voltage supply; and a controller configured to control the DC voltage supply according to an operating state of the vehicle.

The DC voltage supply may comprise a car battery whose function it is to provide a DC voltage to any of several consumers or loads installed in the vehicle (electric door opener; air-conditioning, interior lighting, dashboard lighting, etc.) so that the battery can be regarded as a component in any of several independent consumer circuits.

According to embodiments, the method of operating such an automotive LED lighting system method comprises the steps of determining an operating state of the vehicle; and controlling the DC voltage supply to provide the first DC voltage level to a specific automotive LED lighting module during a first operating state or controlling the DC voltage supply to provide the second DC voltage level to that automotive LED lighting module during a second operating state.

The method can allow for an easy and straightforward reaction to a change in operating states. For example, a vehicle may be equipped with a pair of such automotive LED lighting modules at the front of the vehicle to act as daytime running lights and front position lights. When the driver of the vehicle halts the vehicle and selects the "park light" option from the dashboard, the DC voltage supply provides the second DC voltage level to the front lighting units, which then drive the LED lamps at a low light output level. This switchover from the "full" light output (while driving) to the "dimmed" light output (while parked) is effected without the need for any PWM modules. Similarly, a vehicle may be equipped with a pair of such automotive LED lighting modules at the rear of the vehicle to act as stop lights and tail-lights (rear position lights). The tail-lights are driven by the lower or second DC voltage level. When the driver of the vehicle presses the brake pedal, the DC voltage supply provides the first or higher DC voltage level. Here also, this switchover from the "low" light output (while cruising) to the "high" light output (while braking) is effected without the need for any PWM modules.

The dependent claims and the following description disclose particularly advantageous embodiments and features of the embodiments. Features of the embodiments may be combined as appropriate. Features described in the context of one claim category can apply equally to another claim category.

In the following, without restricting the embodiments in any way, it may be assumed that the DC voltage supply originates from a car battery, and that the first DC voltage level is within a range of 6-24 V, and the second DC voltage level is less than 6 V in order to accommodate for the possibility of voltage transients that may be as low as 6 V. The second DC voltage level can be at most 5 V in some embodiments.

The first driver module can be configured to drive the LED lamp at its rated output flux, and the second driver module is configured to drive the LED lamp at a fraction of its rated output flux, preferably at most 10% of its rated output flux.

In a particular embodiment, the switch arrangement, the first driver module and the second driver module are incorporated in a housing of the automotive LED lighting module, so that the LED lighting module can be provided as a stand-alone lighting unit that can provide two distinct light output levels. The interface for connection to the two-level DC voltage supply comprises a single positive terminal and a ground terminal realised as the two contact pins of the LED lamp.

In one embodiment, the LED lamp comprises a number of red light-emitting diodes to provide a tail light function when the input voltage is at the first level and to provide a rear position light function when the input voltage level is at the second level. In another embodiment, the LED lamp comprises a number of white-emitting LED light sources (e.g. blue-emitting diodes with wavelength-converting phosphor) to provide a headlight function such as DRL when the input voltage is at the first level and to provide a front position light function when the input voltage level is at the second level. Alternatively, the LED lamp provides a front fog-light function when the input voltage is at the first level and a front position light function when the input voltage level is at the second level. In another embodiment, the LED lamp comprises a number of yellow light-emitting diodes to provide an indicator function when the input voltage is at the first level and to provide a side position light function when the input voltage level is at the second level.

For example, the LED lamp may be realized as a standard LW5 lamp for DRL, outputting 350 lm (lumen) when driven by the first driver module. When driven by the second driver module, this same lamp may output only 35-70 lm (10%-20% of full light output), so that it can be used as a front position light. In another example, the LED lamp may be realized as a standard LYS lamp for left/right turn signalling function, outputting 280 lm when driven by the first driver module. When driven by the second driver module, this same lamp may output only 28-56 lm, so that it can be used as a side position light. In another example, the LED lamp may be realized as a standard LR5 lamp for brake light function, outputting 120 lm when driven by the first driver module. When driven by the second driver module, this same lamp may output only 12-24 lm, so that it can be used as a rear tail-light.

In an embodiment, a vehicle comprises an automotive lighting system, in which the vehicle is equipped with a pair of automotive LED lighting modules comprising white-emitting LED light sources, configured to provide a front headlight function and a front position light function; and/or a pair of automotive LED lighting modules comprising red light-emitting diodes, configured to provide rear brake light function and rear tail-light function; and/or a pair of automotive LED lighting modules comprising yellow light-emitting diodes, configured to provide indicator light function and side position light function.

Alternatively or in addition, the vehicle can be equipped with a pair of automotive LED lighting modules comprising white-emitting LED light sources, configured to provide front fog-light function and front headlight function; and/or a pair of automotive LED lighting modules comprising red light-emitting diodes, configured to provide rear tail-light function and rear position light function.

Other aspects and features of embodiments will become apparent from the following detailed descriptions considered in conjunction with the accompanying drawings. It is to be understood, however, that the drawings are designed solely for the purposes of illustration and not as a definition of the limits of embodiments.

BRIEF DESCRIPTION OF THE DRAWINGS

In the drawings, like numbers refer to like components throughout. Components in the diagrams are not necessarily drawn to scale.

DETAILED DESCRIPTION OF THE EMBODIMENTS

Figure 1:
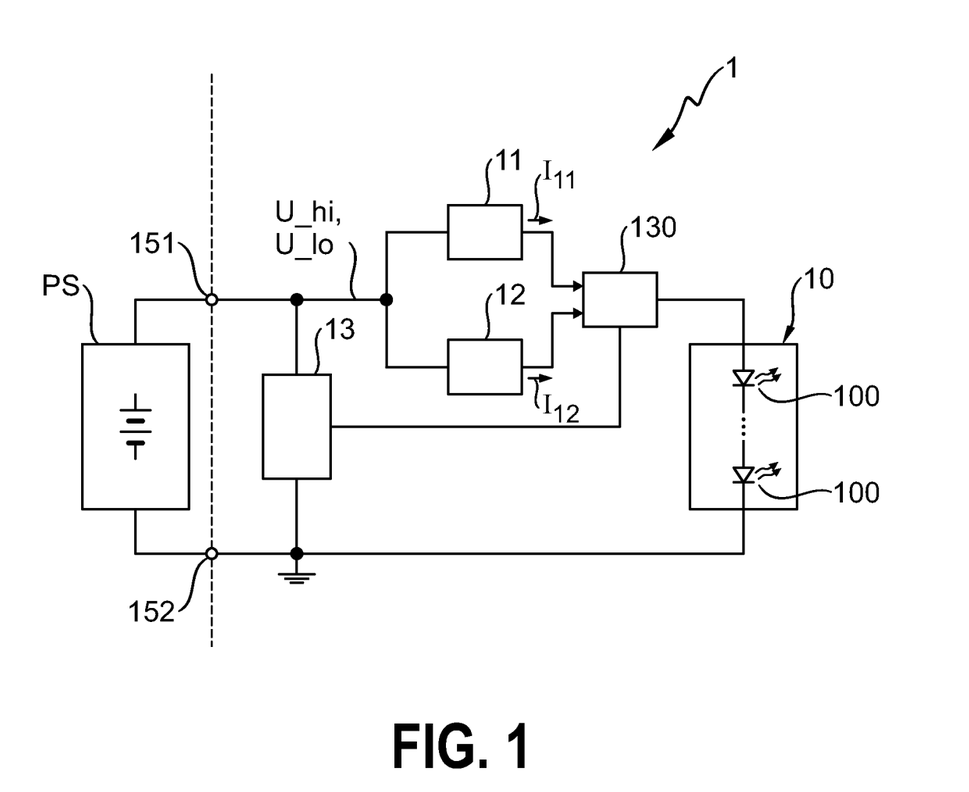
FIG. 1 is a schematic diagram of an embodiment of an automotive LED lighting module.

FIG. 1 is a schematic diagram of an embodiment of the automotive LED lighting module 1. The lighting module 1 comprises an LED lamp 10 with one or more light-emitting diodes 100, a first driver module 11 configured to drive the LED lamp 10 at a first DC voltage level U_hi, and a second driver module 12 configured to drive the LED lamp 10 at a second DC voltage level U_lo, which can be at a level lower than any low transients that may appear on the first DC voltage level U_hi. The lighting module 1 further comprises a switch arrangement 13, 130 connected across an interface 151, 152. The interface can be in the form of a pair of input pins 151, 152 so that the LED lighting module 1 can be inserted into a suitable connector for connection to a DC voltage supply PS that delivers a voltage U_hi, U_lo according to a desired light output level. The switch arrangement 13, 130 is configured to connect the first driver module 11 to the LED lamp 10 when the input voltage is at a first level U_hi, and to connect the second driver module 12 to the LED lamp 10 when the voltage is at a second level U_lo. This could be done in any number of ways. For example, the switch arrangement may comprise a DC level sensing circuit 13 which controls a multiplexer 130 according to the voltage sensed across the inputs 151, 152. When the high voltage level U_hi is sensed, the switch arrangement 13, 130 routes the output of the "high-level" driver module 11 to the LED lamp 10; when the low voltage level U_lo is sensed, the switch arrangement 13, 130 routes the output of the "low-level" driver module 12 to the LED lamp 10. A driver module 11, 12 may be assumed to comprise a suitable driver architecture such as a resistor network, or a linear driver comprising active components, and a driver module 11, 12 is realised to limit the LED current $I_{11}$, $I_{12}$ to a defined level so that the LED lamp 10 is driven at a suitable constant current. The first driver module 11 will ensure that the LED lamp 10 is driven with a higher current $I_{11}$, while the second driver module 12 will ensure that the LED lamp 10 is driven with a lower current $I_{12}$. In the diagram, everything to the right of the interface 151, 152 may be realised inside a housing of the LED module 1. In the embodiment of FIG. 1 the driver modules 11, 12 are shown as functionally separate blocks, each with its own linear driver and control resistor, and the multiplexer 130 effectively connects the output of the desired driver module 11, 12 to the LED lamp 10.

Figure 2:
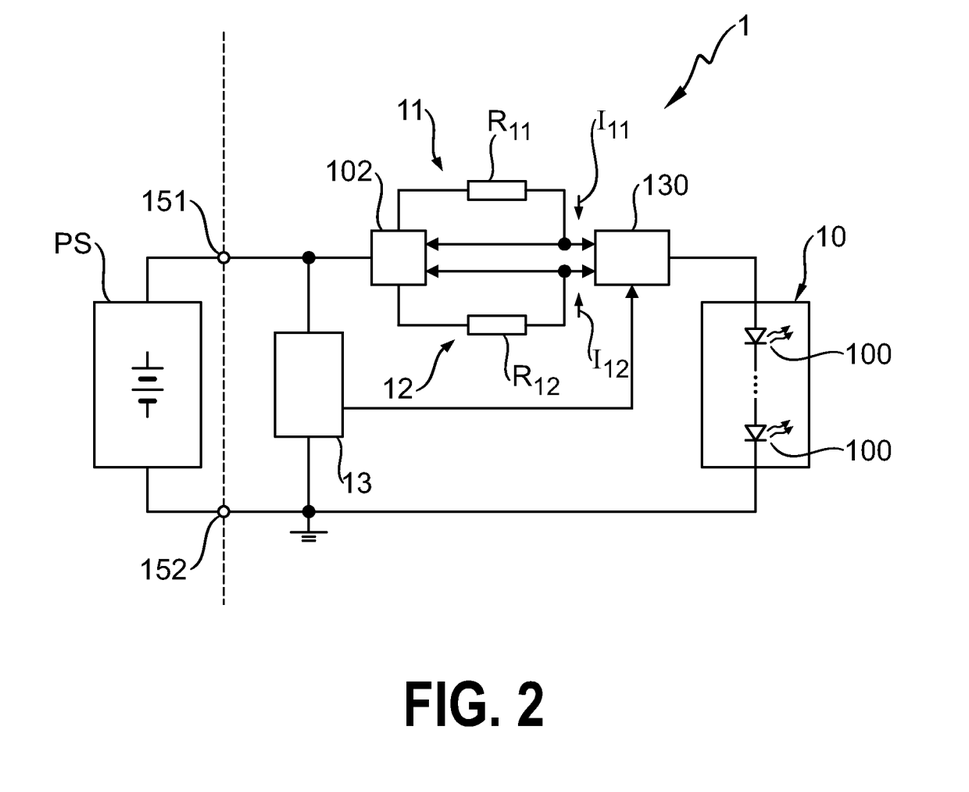
FIG. 2 is a schematic diagram of a further embodiment of an automotive LED lighting module.

FIG. 2 shows an alternative embodiment in which a single linear driver 102 may be used instead, with two distinct control resistors $R_{11}$, $R_{12}$ to determine the desired high and low current levels $I_{11}$, $I_{12}$. In this embodiment, the high-level driver module 11 comprises the linear driver 102 and the first resistor $R_{11}$, and the low-level driver module 12 comprises the linear driver 102 and the second resistor $R_{12}$. The driver modules 11, 12 effectively "share" the single linear driver 102. The multiplexer 130 is arranged to select the high current $I_{11}$ or the low current $I_{12}$ as desired.

Figure 3:
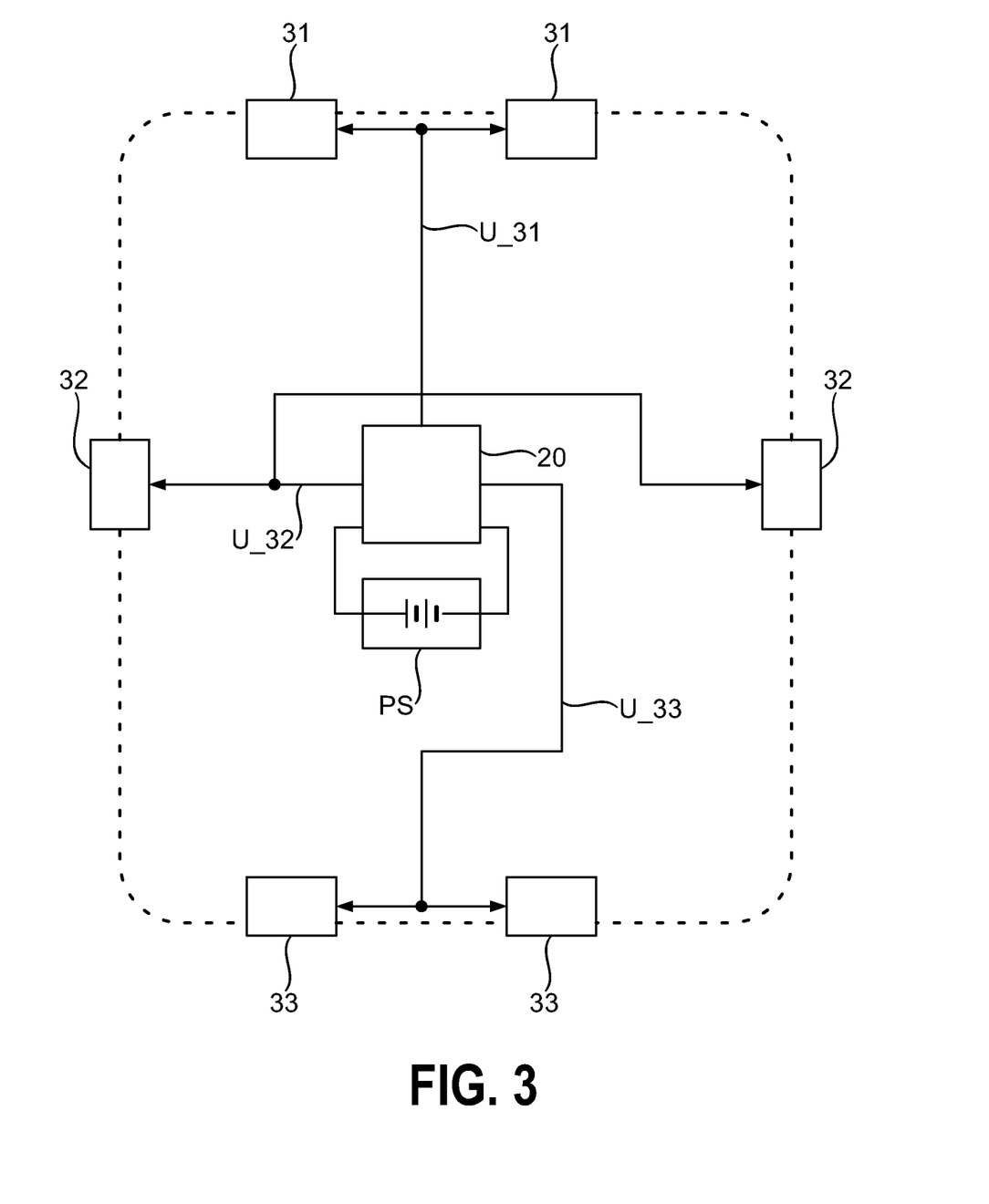
FIG. 3 is a schematic diagram of an embodiment of an automotive lighting system realised in an automobile.

FIG. 3 is a very simplified schematic diagram of an embodiment of the automotive lighting system 2 realised in an automobile 3 (indicated only very schematically be the dotted line). The automobile is equipped with several instances of the automotive LED lighting module 1, all of which are powered by a DC voltage supply PS. In this embodiment, instances of the automotive LED lighting module 1 are installed in front lighting units 31, rear lighting units 32, and side lighting units 33. The power supply PS provides power to a controller 20 or "body control unit" which provides each lighting unit 31, 32, 33 with the appropriate voltage for the applicable operating state of the automobile. For example, when the automobile 3 is being driven, the controller 20 ensures that the voltage U_31 provided to the LED lighting modules 1 of the front lighting units 31 is the high voltage level U_hi referred to in FIG. 1; the voltage U_32 provided to the LED lighting modules 1 of the rear lighting units 32 is the high voltage level U_hi referred to in FIG. 1; and the voltage U_33 provided to the LED lighting modules 1 of the side lighting units 33 is the low voltage level U_lo referred to in FIG. 1. When the automobile 3 is being turned left or right, the controller 20 ensures that the voltage U_33 provided to the LED lighting modules 1 of the side lighting units 33 alternates at a suitable rate between the high voltage level U_hi and the low voltage level U_lo; when the automobile is parked, the controller 20 ensures that the voltage provided to each lighting unit 31, 32, 33 is the low voltage level U_lo referred to in FIG. 1 to activate the position-light function in each case.

Figure 4:
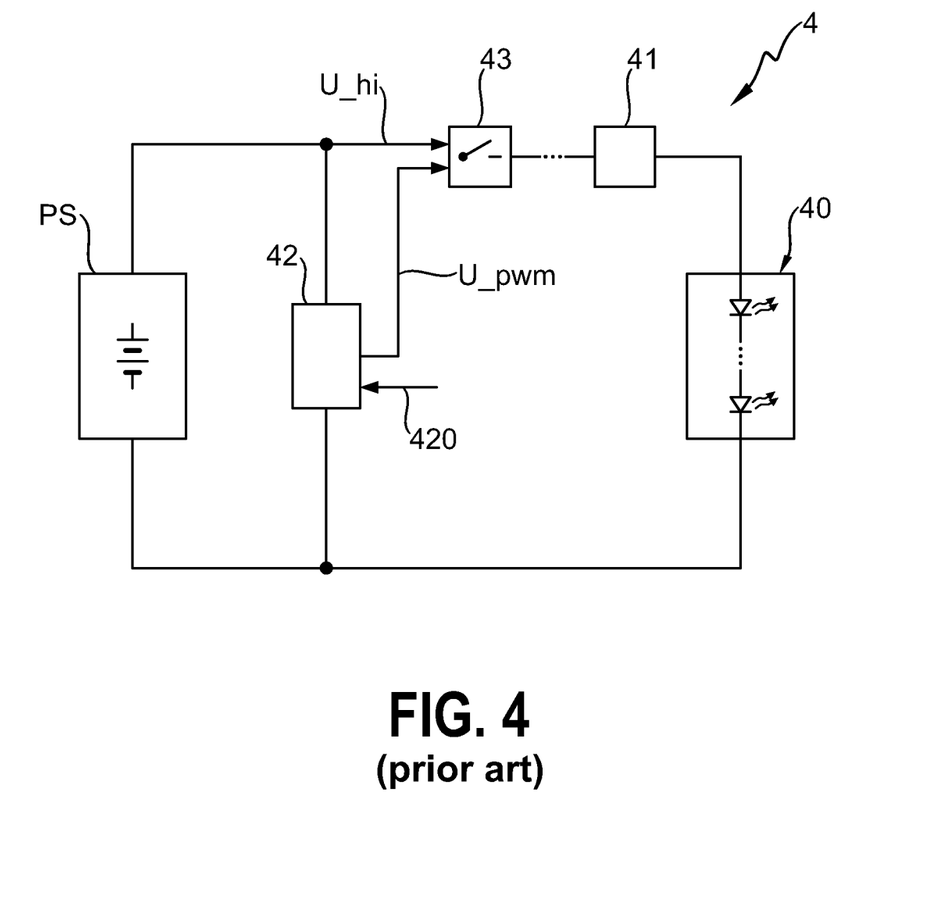
FIG. 4 shows a prior art automotive lighting system that uses a single LED lighting module to provide two functions.

FIG. 4 shows a prior art approach that uses a single LED lighting module 4 that uses a single LED lamp 40 to provide two functions, e.g. a LYS lamp 40 that acts as indicator light when the vehicle is turning, as well as a side position light when the vehicle is not turning. To achieve this, the prior art approach requires a PWM module 42 that is actuated by a control signal 420 originating from a controller (not shown in the diagram) when the LED lamp 40 is to deliver less than its rated flux. By appropriate control of a switching module 43, the driver 40 of the LYS lamp 40 is supplied with the usual voltage level U_hi to deliver 100% rated flux when the lamp 40 is to be used as an indicator light, or with the PWM modulated voltage U_pwm when the LED lamp 40 is to be used as a side position light.

Although embodiments have been disclosed in the form of embodiments and variations thereon, it will be understood that numerous additional modifications and variations could be made thereto without departing from the scope of embodiments. For example, although the automotive LED lighting module has been described to incorporate two driver modules and a switch module in the module housing, it is of course possible to realise the driver modules and switch module independently of an LED lamp. In such an embodiment, a single set of two driver modules and a switch module could be realised to drive a number of LED lamps, for example a number of LED lamps installed in spatially separate regions in a vehicle.

For the sake of clarity, it is to be understood that the use of "a" or "an" throughout this application does not exclude a plurality, and "comprising" does not exclude other steps or elements.

The invention claimed is:

1. An automotive light emitting diode (LED) lighting module comprising:
   an LED lamp comprising a number of light-emitting diodes;
   a first driver module configured to drive the LED lamp at a first DC voltage level (U_hi);
   a second driver module configured to drive the LED lamp at a second DC voltage level (U_lo), which second DC voltage level (U_lo) is lower than the first DC voltage level (U_hi);
   a switch arrangement comprising an interface for connection to a two-level DC voltage supply (PS), and wherein the switch arrangement is configured to connect the first driver module to the LED lamp when the input voltage at the interface is at a first level (U_hi), and to connect the second driver module to the LED lamp when the input voltage level at the interface is at a second level (U_lo).

2. An automotive LED lighting module according to claim 1, wherein the interface for connection to the two-level DC voltage supply (PS) comprises a single positive terminal and a ground terminal.

3. An automotive LED lighting module according to claim 1, wherein the switch arrangement, the first driver module and the second driver module are incorporated in the LED lamp.

4. An automotive LED lighting module according to claim 1, wherein the first driver module is configured to drive the LED lamp at its rated output flux.

5. An automotive LED lighting module according to claim 1, wherein the second driver module is configured to drive the LED lamp, at most, 10% of its rated output flux.

6. An automotive LED lighting module according to claim 1, wherein the LED lamp comprises a number of red light-emitting diodes to provide a tail light function when the input voltage is at the first level (U_hi) and to provide a rear position light function when the input voltage level is at the second level (U_lo).

7. An automotive LED lighting module according to claim 1, wherein the LED lamp comprises a number of white-emitting LED light sources to provide a headlight function when the input voltage is at the first level (U_hi) and to provide a front position light function when the input voltage level is at the second level (U_lo).

8. An automotive LED lighting module according to claim 1, wherein the LED lamp comprises a number of yellow light-emitting diodes to provide an indicator function when the input voltage is at the first level (U_hi) and to provide a side position light function when the input voltage level is at the second level (U_lo).

9. An automotive lighting system of a vehicle, comprising
a DC voltage supply (PS) configured to provide at least a first DC voltage level (U_hi) and a second DC voltage level (U_lo), which second DC voltage level (U_lo) is lower than the first DC voltage level (U_hi);
a number of automotive LED lighting modules, wherein the LED lighting module includes an LED lamp comprising a number of LEDs, a first driver module configured to drive the LED lamp at a first DC voltage level (U_hi), a second driver module configured to drive the LED lamp at a second DC voltage level (U_lo), which second DC voltage level (U_lo) is lower than the first DC voltage level (U_hi), a switch arrangement comprising an interface for connection to a two-level DC voltage supply (PS), and wherein the switch arrangement is configured to connect the first driver module to the LED lamp when the input voltage at the interface is at a first level (U_hi), and to connect the second driver module to the LED lamp (10) when the input voltage level at the interface is at a second level (U_lo); and
a controller configured to control the DC voltage supply (PS) according to an operating state of the vehicle.

10. An automotive lighting system according to claim 9, wherein the first DC voltage level (U_hi) is 13.5 V.

11. An automotive lighting system according to claim 9, wherein the second DC voltage level (U_lo) is less than 6 V.

12. An automotive lighting system according to claim 9, wherein the vehicle is equipped with
a front lighting unit in which an automotive LED lighting module with white-emitting light emitting diode (LED) light sources is arranged to provide a front signaling function and a front position light function; and/or
a rear lighting unit in which an automotive LED lighting module with red light-emitting diodes is arranged to provide rear signaling function and rear position light function; and/or
a side lighting unit in which an automotive LED lighting module with yellow light-emitting diodes is arranged to provide indicator light function and side position light function.

13. A method of operating an automotive light emitting diode (LED) lighting system, which method comprises the steps of
determining an operating state of a vehicle;
controlling a DC voltage supply (PS) to provide a first DC voltage level (U_hi) to a specific automotive LED lighting module during a first operating state, wherein the LED lighting module includes an LED lamp comprising a number of LEDs, a first driver module configured to drive the LED lamp at a first DC voltage level (U_hi), a second driver module configured to drive the LED lamp at a second DC voltage level (U_lo), which second DC voltage level (U_lo) is lower than the first DC voltage level (U_hi), a switch arrangement comprising an interface for connection to a two-level DC voltage supply (PS), and wherein the switch arrangement is configured to connect the first driver module to the LED lamp when the input voltage at the interface is at a first level (U_hi), and to connect the second driver module to the LED lamp (10) when the input voltage level at the interface is at a second level (U_lo); and
controlling the DC voltage supply (PS) to provide the second DC voltage level (U_lo) to that automotive LED lighting module during a second operating state.

14. A method of operating the automotive LED lighting module according to claim 13, further comprising connecting to the two-level DC voltage supply (PS) using a single positive terminal and a ground terminal.

15. A method of operating the automotive LED lighting module according to claim 13, further comprising incorporating the switch arrangement, the first driver module and the second driver module are incorporated in the LED lamp.

16. A method of operating the automotive LED lighting module according to claim 13, wherein the first driver module is configured to drive the LED lamp at its rated output flux.

17. A method of operating the automotive LED lighting module according to claim 13, further comprising driving, by the second driver module, the LED lamp at, at most, 10% of its rated output flux.

18. A method of operating the automotive LED lighting module according to claim 13, providing, by a number of red light-emitting diodes of the LED lamp, a tail light function when the input voltage is at the first level (U_hi) and to a rear position light function when the input voltage level is at the second level (U_lo).

19. A method of operating the automotive LED lighting module according to claim 13, further comprising providing, by a number of white-emitting LED light source of the LED lamp, a headlight function when the input voltage is at the first level (U_hi) and a front position light function when the input voltage level is at the second level (U_lo).

20. A method of operating the automotive LED lighting module according to claim 13, further comprising providing, by a number of yellow LEDs of the LED lamp, an indicator function when the input voltage is at the first level (U_hi) and to a side position light function when the input voltage level is at the second level (U_lo).

* * * * *

UNITED STATES PATENT AND TRADEMARK OFFICE
CERTIFICATE OF CORRECTION

PATENT NO. : 10,808,900 B1
APPLICATION NO. : 16/789130
DATED : October 20, 2020
INVENTOR(S) : Andreas Timinger It is certified that error appears in the above-identified patent and that said Letters Patent is hereby corrected as shown below:

In the Claims

In Column 6, Line 47, in Claim 1, delete "level (U_hi);" and insert --level;-- therefor In Column 6, Line 49, in Claim 1, delete "level (U_lo), which" and insert --level, the-- therefor In Column 6, Line 50, in Claim 1, after "level", delete "(U_lo) is"

In Column 6, Line 51, in Claim 1, delete "level (U_hi);" and insert --level;-- therefor In Column 6, Line 53, in Claim 1, delete "supply (PS)," and insert --supply,-- therefor In Column 6, Line 54, in Claim 1, before "the switch", delete "wherein"

In Column 6, Line 54, in Claim 1, after "arrangement", delete "is"

In Column 6, Line 55, in Claim 1, delete "the" and insert --an-- therefor

In Column 6, Line 56, in Claim 1, delete "level (U_hi)," and insert --level,-- therefor In Column 6, Line 58, in Claim 1, after "voltage", delete "level"

In Column 6, Line 59, in Claim 1, delete "level (U_lo)." and insert --level.-- therefor In Column 6, Line 60, in Claim 2, delete "An" and insert --The-- therefor In Column 6, Line 62, in Claim 2, after "supply", delete "(PS)"

In Column 6, Line 64, in Claim 3, delete "An" and insert --The-- therefor

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,808,900 B1

In Column 7, Line 1, in Claim 4, delete "An" and insert --The-- therefor

In Column 7, Line 3, in Claim 4, delete "its" and insert --a-- therefor

In Column 7, Line 3, in Claim 4, delete "flux." and insert --flux of the LED lamp.-- therefor In Column 7, Line 4, in Claim 5, delete "An" and insert --The-- therefor In Column 7, Line 6, in Claim 5, delete "lamp," and insert --lamp at,-- therefor In Column 7, Line 6, in Claim 5, delete "its" and insert --a-- therefor In Column 7, Line 6, in Claim 5, delete "flux." and insert --flux of the LED lamp.-- therefor In Column 7, Line 7, in Claim 6, delete "An" and insert --The-- therefor In Column 7, Line 9, in Claim 6, delete "light-emitting diodes" and insert --LEDs-- therefor In Column 7, Line 10, in Claim 6, after "level", delete "(U_hi)"

In Column 7, Line 11, in Claim 6, after "voltage", delete "level"

In Column 7, Line 12, in Claim 6, delete "level (U_lo)." and insert --level.-- therefor In Column 7, Line 13, in Claim 7, delete "An" and insert --The-- therefor In Column 7, Line 15, in Claim 7, delete "LED light sources" and insert --LEDs-- therefor In Column 7, Line 16, in Claim 7, after "level", delete "(U_hi)"

In Column 7, Line 18, in Claim 7, after "voltage", delete "level"

In Column 7, Line 18, in Claim 7, delete "level (U_lo)." and insert --level.-- therefor In Column 7, Line 19, in Claim 8, delete "An" and insert --The-- therefor In Column 7, Line 21, in Claim 8, delete "light-emitting diodes" and insert --LEDs-- therefor In Column 7, Line 22, in Claim 8, after "level", delete "(U_hi)"

In Column 7, Line 25, in Claim 8, before "is at", delete "level"

In Column 7, Line 25, in Claim 8, delete "level (U_lo)." and insert --level.-- therefor In Column 7, Line 26, in Claim 9, after "comprising", insert --:--

CERTIFICATE OF CORRECTION (continued)

In Column 7, Line 27, in Claim 9, after "supply", delete "(PS)"

In Column 7, Line 28, in Claim 9, after "level", delete "(U_hi)"

In Column 7, Line 29, in Claim 9, delete "level (U_lo), which" and insert --level, the-- therefor In Column 7, Line 29, in Claim 9, after "level", delete "(U_lo) is"

In Column 7, Line 30, in Claim 9, delete "level (U_hi);" and insert --level;-- therefor In Column 7, Line 31, in Claim 9, delete "LED" and insert --light emitting diode (LED)-- therefor In Column 7, Line 31, in Claim 9, after "modules,", delete "wherein"

In Column 7, Line 32, in Claim 9, delete "includes" and insert --including-- therefor In Column 7, Line 35, in Claim 9, delete "level (U_hi)," and insert --level,-- therefor In Column 7, Lines 36-37, in Claim 9, delete "level (U_lo), which" and insert --level, the-- therefor In Column 7, Line 37, in Claim 9, after "level", delete "(U_lo) is"

In Column 7, Line 38, in Claim 9, delete "level (U_hi)," and insert --level,-- therefor In Column 7, Line 40, in Claim 9, delete "supply (PS)," and insert --supply,-- therefor In Column 7, Line 40, in Claim 9, after "and", delete "wherein"

In Column 7, Line 41, in Claim 9, after "arrangement", delete "is"

In Column 7, Line 42, in Claim 9, delete "the" and insert --an-- therefor

In Column 7, Line 43, in Claim 9, delete "level (U_hi)," and insert --level,-- therefor In Column 7, Line 44, in Claim 9, after "lamp", delete "(10)"

In Column 7, Line 45, in Claim 9, after "voltage", delete "level"

In Column 7, Line 45-46, in Claim 9, delete "level (U_lo);" and insert --level;-- therefor In Column 7, Line 48, in Claim 9, before "according", delete "(PS)"

In Column 7, Line 49, in Claim 10, delete "An" and insert --The-- therefor

In Column 7, Line 50, in Claim 10, after "level", delete "(U_hi)"

CERTIFICATE OF CORRECTION (continued)
U.S. Pat. No. 10,808,900 B1

In Column 7, Line 51, in Claim 11, delete "An" and insert --The-- therefor

In Column 7, Line 52, in Claim 11, after "level", delete "(U_lo)"

In Column 7, Line 54, in Claim 12, delete "An" and insert --The-- therefor

In Column 7, Line 55, in Claim 12, after "with", insert --:--

In Column 7, Lines 57-58, in Claim 12, delete "light emitting diode (LED) light sources" and insert --LEDs-- therefor In Column 7, Line 61, in Claim 12, delete "light-emitting diodes" and insert --LEDs-- therefor In Column 7, Line 62, in Claim 12, after "provide", insert --a--

In Column 7, Line 62, in Claim 12, before "rear", insert --a--

In Column 8, Line 2, in Claim 12, delete "light-emitting diodes" and insert --LEDs-- therefor In Column 8, Line 3, in Claim 12, before "indicator", insert --an--

In Column 8, Line 3, in Claim 12, before "side", insert --a--

In Column 8, Line 6, in Claim 13, delete "which" and insert --the-- therefor

In Column 8, Lines 6-7, in Claim 13, delete "comprises the steps of" and insert --comprising:--therefor In Column 8, Line 9, in Claim 13, after "supply", delete "(PS)"

In Column 8, Line 10, in Claim 13, after "level", delete "(U_hi)"

In Column 8, Line 10, in Claim 13, before "automotive", delete "specific"

In Column 8, Line 11, in Claim 13, after "state,", delete "wherein"

In Column 8, Line 12, in Claim 13, delete "includes" and insert --including-- therefor In Column 8, Line 14, in Claim 13, delete "level (U_hi)," and insert --level,-- therefor In Column 8, Lines 15-16, in Claim 13, delete "level (U_lo), which" and insert --level, the-- therefor In Column 8, Line 16, in Claim 13, after "level", delete "(U_lo) is"

In Column 8, Line 17, in Claim 13, delete "level (U_hi)," and insert --level,-- therefor In Column 8, Line 19, in Claim 13, delete "supply (PS)," and insert --supply,-- therefor

CERTIFICATE OF CORRECTION (continued)
U.S. Pat. No. 10,808,900 B1

In Column 8, Line 19, in Claim 13, after "and", delete "wherein"

In Column 8, Line 20, in Claim 13, after "arrangement", delete "is"

In Column 8, Line 21, in Claim 13, delete "the" (second occurrence) and insert --an-- therefor In Column 8, Line 22, in Claim 13, delete "level (U_hi)," and insert --level,-- therefor In Column 8, Line 23, in Claim 13, after "lamp", delete "(10)"

In Column 8, Line 24, in Claim 13, after "voltage", delete "level"

In Column 8, Lines 24-25, in Claim 13, delete "level (U_lo);" and insert --level;-- therefor In Column 8, Line 26, in Claim 13, after "supply", delete "(PS)"

In Column 8, Line 27, in Claim 13, after "level", delete "(U_lo)"

In Column 8, Line 27, in Claim 13, delete "that" and insert --the-- therefor

In Column 8, Line 29, in Claim 14, delete "A" and insert --The-- therefor

In Column 8, Line 30, in Claim 14, delete "module" and insert --system-- therefor In Column 8, Line 31, in Claim 14, after "supply", delete "(PS)"

In Column 8, Line 33, in Claim 15, delete "A" and insert --The-- therefor

In Column 8, Line 34, in Claim 15, delete "module" and insert --system-- therefor In Column 8, Line 36, in Claim 15, after "module", delete "are"

In Column 8, Line 37, in Claim 16, delete "A" and insert --The-- therefor

In Column 8, Line 38, in Claim 16, delete "module" and insert --system-- therefor In Column 8, Line 39, in Claim 16, delete "its" and insert --a-- therefor In Column 8, Line 40, in Claim 16, delete "flux." and insert --flux of the LED lamp.-- therefor In Column 8, Line 41, in Claim 17, delete "A" and insert --The-- therefor In Column 8, Line 42, in Claim 17, delete "module" and insert --system-- therefor In Column 8, Line 44, in Claim 17, delete "its" and insert --a-- therefor CERTIFICATE OF CORRECTION (continued)
U.S. Pat. No. 10,808,900 B1

In Column 8, Line 44, in Claim 17, delete "flux." and insert --flux of the LED lamp.-- therefor In Column 8, Line 45, in Claim 18, delete "A" and insert --The-- therefor In Column 8, Line 46, in Claim 18, delete "module" and insert --system-- therefor In Column 8, Line 46, in Claim 18, before "providing,", insert --further comprising--

In Column 8, Line 47, in Claim 18, delete "light-emitting diodes" and insert --LEDs-- therefor In Column 8, Line 48, in Claim 18, after "level", delete "($U\_hi$)"

In Column 8, Line 49, in Claim 18, after "voltage", delete "level"

In Column 8, Line 50, in Claim 18, delete "level ($U\_lo$)." and insert --level.-- therefor In Column 8, Line 51, in Claim 19, delete "A" and insert --The-- therefor In Column 8, Line 52, in Claim 19, delete "module" and insert --system-- therefor In Column 8, Line 53, in Claim 19, delete "LED light source" and insert --LEDs-- therefor In Column 8, Line 55, in Claim 19, after "level", delete "($U\_hi$)"

In Column 8, Line 56, in Claim 19, after "voltage", delete "level"

In Column 8, Line 56, in Claim 19, delete "level ($U\_lo$)." and insert --level.-- therefor In Column 8, Line 57, in Claim 20, delete "A" and insert --The-- therefor In Column 8, Line 58, in Claim 20, delete "module" and insert --system-- therefor In Column 8, Line 60, in Claim 20, after "level", delete "($U\_hi$)"

In Column 8, Line 62, in Claim 20, after "voltage", delete "level"

In Column 8, Line 62, in Claim 20, delete "level ($U\_lo$)." and insert --level.-- therefor